(12) United States Patent
Miller et al.

(10) Patent No.: US 11,178,180 B2
(45) Date of Patent: Nov. 16, 2021

(54) RISK ANALYSIS AND ACCESS ACTIVITY CATEGORIZATION ACROSS MULTIPLE DATA STRUCTURES FOR USE IN NETWORK SECURITY MECHANISMS

(71) Applicant: EMC IP Holding Company LLC, Hopkinton, MA (US)

(72) Inventors: Sean Miller, Waterloo (CA); Aaron Beaudoin, Bolton, MA (US); Avinash Sangappa, Marlborough, MA (US); Venkata Kanaparthy, Hamburg (DE)

(73) Assignee: EMC IP Holding Company LLC, Hopkinton, MA (US)

( * ) Notice: Subject to any disclaimer, the term of this patent is extended or adjusted under 35 U.S.C. 154(b) by 555 days.

(21) Appl. No.: 16/177,930

(22) Filed: Nov. 1, 2018

(65) Prior Publication Data
US 2020/0145460 A1 May 7, 2020

(51) Int. Cl.
*H04L 29/06* (2006.01)
*G06F 3/0484* (2013.01)
*G06F 16/26* (2019.01)
*G06F 16/28* (2019.01)

(52) U.S. Cl.
CPC ............ *H04L 63/20* (2013.01); *G06F 3/0484* (2013.01); *G06F 16/26* (2019.01); *G06F 16/287* (2019.01); *H04L 63/10* (2013.01)

(58) Field of Classification Search
CPC .......................... H04L 63/20; H04L 63/1433
See application file for complete search history.

(56) References Cited

U.S. PATENT DOCUMENTS

| 9,047,323 | B2 * | 6/2015 | Ducharme | G06F 16/21 |
| 9,495,393 | B2 | 11/2016 | Ducharme et al. | |
| 2002/0099704 | A1 * | 7/2002 | Martin, Jr. | G06F 16/26 |
| 2002/0174087 | A1 * | 11/2002 | Hao | G06F 16/26 |
| 2003/0028803 | A1 * | 2/2003 | Bunker, V | H04L 43/00 |
| | | | | 726/4 |
| 2003/0056116 | A1 * | 3/2003 | Bunker, V | H04L 63/1433 |
| | | | | 726/25 |
| 2003/0217039 | A1 * | 11/2003 | Kurtz | G02B 6/12023 |

(Continued)

*Primary Examiner* — Ponnoreay Pich
(74) *Attorney, Agent, or Firm* — Ryan, Mason & Lewis, LLP

(57) ABSTRACT

Methods, apparatus, and processor-readable storage media for risk analysis and access activity categorization across data structures for use in network security mechanisms are provided herein. An example computer-implemented method includes analyzing data, derived from a first set of data structures within a network, pertaining to items of access activity within the network; categorizing, based at least in part on the data analysis, the access activity into multiple review analysis categories; processing, based at least in part on the categorization, the analyzed data into a second set of multiple data structures corresponding to the review analysis categories; generating a visualization of the access activity categorized into the review analysis categories, wherein the visualization comprises displayed access to the second set of multiple data structures; outputting the generated visualization to a user via a GUI; and facilitating, based on user inputs via the GUI, access certification actions within the network.

20 Claims, 4 Drawing Sheets

(56) References Cited

U.S. PATENT DOCUMENTS

| | | | |
|---|---|---|---|
| 2004/0088577 A1* | 5/2004 | Render | H04L 63/1408 |
| | | | 726/25 |
| 2007/0174245 A1* | 7/2007 | Folting | G06F 16/26 |
| 2008/0052102 A1* | 2/2008 | Taneja | G06Q 10/103 |
| | | | 705/7.11 |
| 2008/0141377 A1* | 6/2008 | Dunagan | H04L 63/1433 |
| | | | 726/25 |
| 2008/0256040 A1* | 10/2008 | Sundaresan | G06F 16/338 |
| 2010/0074112 A1* | 3/2010 | Derr | H04L 41/12 |
| | | | 370/232 |
| 2010/0076906 A1* | 3/2010 | Eubank | G06Q 40/06 |
| | | | 705/36 R |
| 2010/0250021 A1* | 9/2010 | Cook | G07C 5/085 |
| | | | 701/1 |
| 2011/0126111 A1* | 5/2011 | Gill | G06F 21/577 |
| | | | 715/736 |
| 2013/0031070 A1* | 1/2013 | Ducharme | G06F 16/21 |
| | | | 707/705 |
| 2020/0145460 A1* | 5/2020 | Miller | H04L 63/1425 |

\* cited by examiner

FIG. 2

RISK ANALYSIS AND ACCESS ACTIVITY CATEGORIZATION ACROSS MULTIPLE DATA STRUCTURES FOR USE IN NETWORK SECURITY MECHANISMS

FIELD

The field relates generally to information processing systems, and more particularly to techniques for providing security in such systems.

BACKGROUND

Review analysis typically includes access certification and other tasks intended to reduce overall identity risk within organizations or other enterprises by identifying items of risk that might require attention and/or remediation. However, conventional review analysis approaches face efficiency, accuracy, and scalability issues, as such approaches generally require a reviewer to examine all access-related activity of a given user, and individually certify each such instance of activity. Problems can arise because important and/or sensitive data can be buried in large sets of access-related activity data, creating the possibility that the reviewer might overlook or mischaracterize such important and/or sensitive data.

SUMMARY

Illustrative embodiments of the invention provide techniques for risk analysis and access activity categorization across multiple data structures for use in network security mechanisms. An exemplary computer-implemented method can include analyzing data, derived from a first set of multiple data structures within a network, pertaining to multiple items of access activity within the network, and categorizing, based at least in part on the analyzing of the data, the multiple items of access activity into multiple review analysis categories. Such a method can also include processing, based at least in part on the categorization, the analyzed data into a second set of multiple data structures within the network, wherein the second set of multiple data structures corresponds to the multiple review analysis categories, and generating a visualization of the multiple items of access activity categorized into the multiple review analysis categories, wherein the visualization comprises displayed access to the second set of multiple data structures. Further, such a method can additionally include outputting the generated visualization to at least one user via a graphical user interface, and facilitating, based on one or more user inputs to the generated visualization via the graphical user interface, one or more access certification actions within the network.

Illustrative embodiments can provide significant advantages relative to conventional review analysis arrangements. For example, challenges associated with missing and/or overlooking important and/or sensitive data among large sets of data are overcome through the categorization of access activity data into pre-determined categories related to different risk attributes based on determinations made via risk analysis algorithms.

These and other illustrative embodiments described herein include, without limitation, methods, apparatus, systems, and computer program products comprising processor-readable storage media.

BRIEF DESCRIPTION OF THE DRAWINGS

FIG. 2 shows an example screen shot of a user interface in an illustrative embodiment of the invention.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
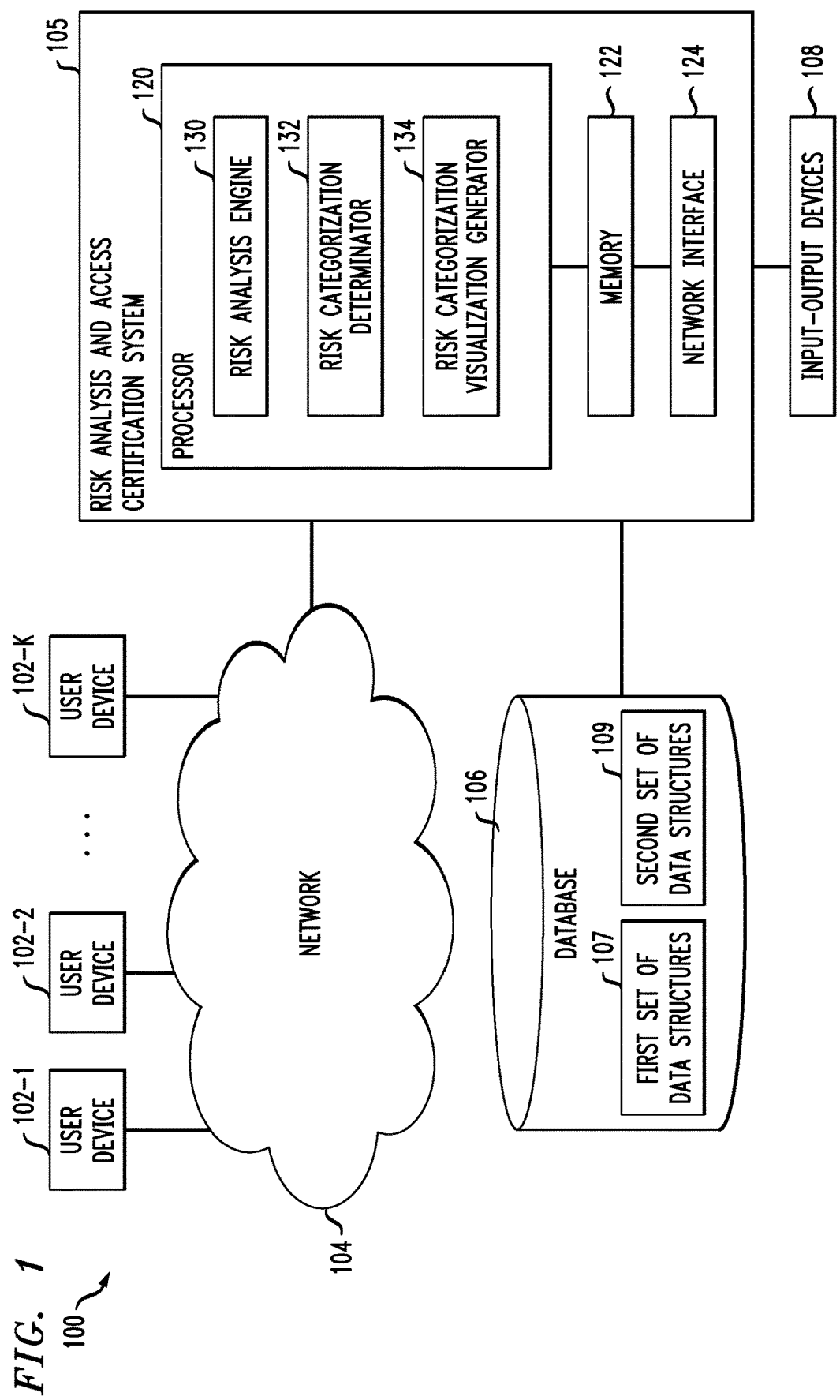
FIG. 1 shows an information processing system configured for risk analysis and access activity categorization across multiple data structures for use in network security mechanisms in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a risk analysis and access certification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The risk analysis and access certification system 105 has an associated database 106 configured to store data related to risk analysis and data categorization. The database 106 more particularly includes a first set of distinct data structures 107 configured to store data pertaining to access activity (such as access privilege information) within a network. In one or more embodiments of the invention, various distinct data structures within this first set of data structures 107 can be associated with and/or attributed to different/distinct sources of access activity data (including access privilege information, for example) within the network. Additionally, the database 106 includes a second set of distinct data structures 109 configured to store processed and categorized (via one or more algorithms implemented by embodiments of the invention) access activity data within the network. For example, in at least one embodiment of the invention, the data structures within the second set of data structures 109 can include multiple distinct data structures corresponding to multiple pre-defined review analysis categories (into which the access activity data are processed and stored). By way of further example, in one or more embodiments of the invention, each review analysis category can be attributed to a distinct respective data structure within the second set of data structures 109.

The database 106 in the present embodiment is implemented using one or more storage systems associated with the risk analysis and access certification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the risk analysis and access certification system 105 are input-output devices 108, which illustratively comprise keyboards, displays or other types of input-output devices in any combination. Such input-output devices are used to support one or more user interfaces to the risk analysis and access certification system 105, as well as to support communication between the risk analysis and access certification system 105 and other related systems and devices not explicitly shown.

The risk analysis and access certification system 105 in the FIG. 1 embodiment is assumed to be implemented using at least one processing device. Each such processing device generally comprises at least one processor and an associated memory, and implements one or more functional modules for controlling certain features of the risk analysis and access certification system 105.

More particularly, the risk analysis and access certification system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the risk analysis and access certification system 105 to communicate over the network 104 with the user devices 102, and illustratively comprises one or more conventional transceivers.

The processor 120 further comprises a risk analysis engine 130, a risk categorization determinator 132, and a risk categorization visualization generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the risk analysis engine 130, risk categorization determinator 132, and risk categorization visualization generator 134 may be implemented at least in part in the form of software that is stored in memory 122 and executed by processor 120.

It is to be understood that the particular set of elements shown in FIG. 1 for risk analysis and access activity categorization across multiple data structures involving user devices 102 and data structure sets 107 and 109 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the risk analysis and access certification system 105 can be eliminated and associated elements such as risk analysis engine 130, risk categorization determinator 132, and risk categorization visualization generator 134 can be implemented elsewhere in the computer network 100.

An exemplary process utilizing risk analysis engine 130, risk categorization determinator 132, and risk categorization visualization generator 134 of the risk analysis and access certification system 105 in computer network 100 will be described in more detail with reference to the flow diagram of FIG. 3.

In at least one embodiment of the invention, the risk analysis engine 130 can improve risk awareness, reduce the volume of decision-making related to access certification, and identify outliers and/or rogue access instances among sets of access activity data (such as access privilege information, for example). Improvement to risk awareness can be achieved, for example, by identifying high-risk access activity data items as well as access activity data items with rule violations, and highlighting access activity data items associated with privileged access as well as a previous access that was removed but has since returned. Reducing decision-making volume can be achieved, for example, by identifying access activity data associated with common access activity (as decisions pertaining to these types of data are typically efficiently handled), access activity data associated with recently approved items, and access activity data that have not changed since a previous risk analysis review (within one or more temporal parameters). Further, in at least one embodiment of the invention, outliers and/or rogue instances access activity data can be identified, for example, by highlighting access that one or more particular users have that one or more particular other users do not have or is uncommon among the other users.

Accordingly, in conjunction with risk categorization determinator 132 and the risk categorization visualization generator 134, the risk analysis engine 130 can identify and display items to a reviewer such that the reviewer can make relevant access certification decisions quickly (or ignore altogether) and focus more attention and/or bandwidth on the access activity data related to outliers and/or rogue access. Additionally, in one or more embodiments of the invention, the above-noted reviewer can be a human reviewer and/or an automated reviewer (wherein one or more algorithms carry out access certification tasks based at least in part on the outputs of the risk analysis and certification system 105 and/or one or more human/user inputs in conjunction with the system 105 outputs).

Figure 2:
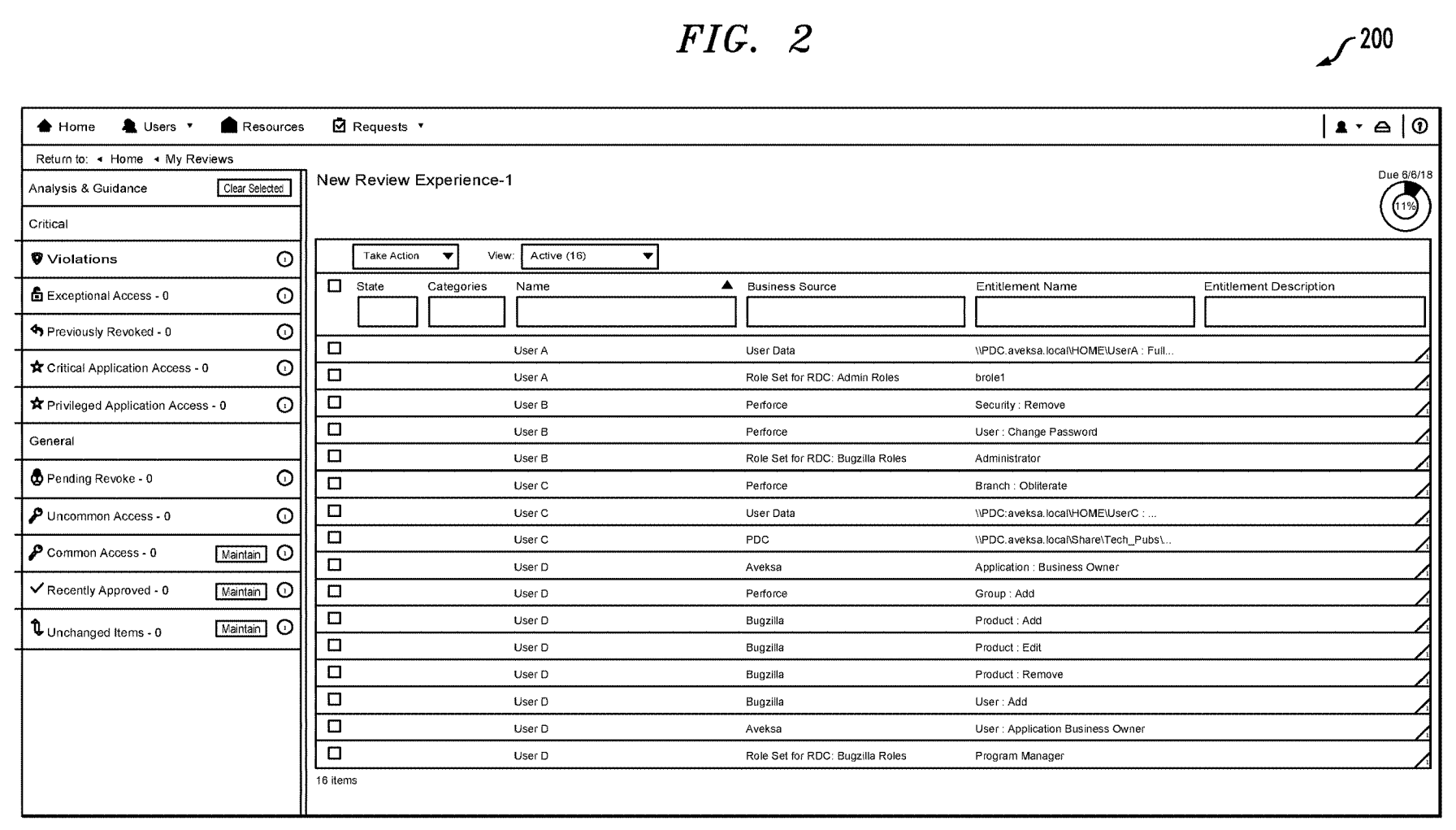

One or more embodiments of the invention can be carried out as part of a review generation process, wherein the results can be saved and stored across multiple data structures (of the above-noted second set of data structures, for example) for subsequent use and implementation via the user interface for the reviewer (such as depicted, for example, in FIG. 2). Additionally, in such embodiments, the user interface renders the analysis results the control center of the review.

FIG. 2 shows an example screen shot of a graphical user interface (GUI) 200 in an illustrative embodiment of the invention. As depicted in FIG. 2, the analysis and guidance panel of GUI 200 is shown to the reviewer in a left panel. Selecting a category in this panel will then show results (drawing the corresponding data from the data structure pertaining to the selected category) to the reviewer. The categories can be organized in a variety of configurations (for example, the categories can be organized in order of importance, from most important to least important, according to pre-defined parameters set by one or more users). Some categories may, for example, correspond with high-level actions that can be taken on the entire category (such as, for example, revoking access) to help make the review more efficient. Other categories that may require more reviewer attention (such as, for example, high-risk items) can be highlighted in accordance with at least one embodiment of the invention.

As detailed herein, one or more embodiments of the invention encompass multiple review analysis types/categories. By way of example, such analysis types can include the below analysis metrics, which will be calculated for review items in user reviews. Items belonging to each review analysis metric (or category) can be highlighted and displayed for the reviewers.

One such category includes "infrequently used entitlements," which refers to the entitlements that are held by a low percentage of users being reviewed by a given reviewer. For example, the percentage of users can be less than 10 percent of users being reviewed; that is, all of the entitlements shared by less than 10% of users being reviewed will be marked as low frequency entitlements. Such a categorization can prompt the reviewer to carefully review such access activity data and determine if the users need the access.

Another such category includes "violations," which refers to data items that correspond with violations from any of the rules in the system. Such data items can be highlighted for the reviewers such that the data items can be efficiently examined. Additionally, such rules can be defined, for example, in the system to determine what access would be in violation of one or more organizational policies. Based on the observed violations of such rules, the user access under review can be marked as being associated with one or more violations.

Yet another category includes "previously revoked," which refers to data items associated with accesses and/or user entitlements that were revoked earlier in previous reviews. If such a data item is processed and being seen in a review, the data item can be marked and/or highlighted, prompting the reviewer to look for reasons for the processed data item's presence in the review and take appropriate action. For example, an example embodiment of the invention can include checking for the presence of a change request entry for revoking the access and/or user entitlement in question that was previously successfully completed.

Another category includes "critical objects," which can refer to a new attribute added to the business source objects. By way of example, the value for such an attribute can be 'None,' 'Low,' 'Medium,' and 'High,' with a default value of 'None.' All attributes having an attribute value set to 'High,' for example, would be considered critical, and such access activity data would be highlighted in reviews for careful consideration by the reviewer. Additionally, another category includes "privileged entitlements," which refers to an attribute on the business source, wherein the business source can be specified as having privileged access. Such access activity data, for example, could be highlighted in reviews for careful consideration. Accordingly, in at least one embodiment of the invention, when onboarding applications into the system, the applications can be marked with having critical and/or privileges access, in which case, all user entitlements derived from such applications will be marked with the respective/appropriate tag(s) during review.

Another category includes "recently approved," which refers to data items that have been recently approved by the reviewer that is reviewing the items. Such a categorization is an indication to the reviewer that such items can be quickly maintained given that the reviewer was the one that previously/recently approved the access. By way of example, in one or more embodiments of the invention, only items approved in the last 30 days will be marked as recently approved. Such an example embodiment can include determining, while performing a review analysis, if there is any completed change request to grant a given user entitlement within the last 30 days.

Yet another category includes "pending revocations." When a change request is pending for revoking access represented by the review item, the item can be marked as having a pending revocation. In one or more embodiments of the invention, these types of data items can automatically be marked as revoked during the review generation, and the review item will subsequently be locked. If the change item corresponding to the review item gets cancelled, the data item can be unlocked for further action by the reviewer. A user entitlements denoted as a "pending revocation" can include a user entitlement that has already been revoked in the system but has not been removed from the source. Additionally, an example embodiment of the invention can include examining the revoke type change requests for the user entitlements that are in an open and/or pending state.

Another category includes "unchanged items," which refer to data items wherein the user and the entitlement designation have not changed since the same data item was last reviewed. In at least one embodiment of the invention, all of the user and entitlement attributes, for each processed access activity data item, are compared against one another (between the last review instance and the current review) to determine if there is any change in the attributes. If there is no change in any of the attributes, the data item can be marked as unchanged. Given no changes, the reviewer can mostly look to maintain such items (unless there are other and/or new compelling reasons to revoke the access). One or more embodiments of the invention can include incorporating a temporal parameter (for example, on month) to be used in connection with this category designation.

Yet another category includes "common access items," which highlights the access type(s) hat is/are shared by a given percentage of users that are being reviewed by a given reviewer. For example, if five entitlements are shared by at least 90% of the users being reviewed by reviewer X, all such items will be categorized as "common access." When a data item is marked as "common access," the reviewer can maintain such an item because the access is shared by multiple users and logically one that is required. Additionally, at least one embodiment of the invention can include calculating a common access percentage based at least in part on the entitlements in the review, the total number of users in the review, and the number of those users possessing one or more particular entitlements.

Another category includes "exceptional access," which indicates a violating access type wherein the access is exempted from being a violation for a specified amount of time. Once that specified amount of time expires, the access again becomes a violation. Accordingly, at least one embodiment of the invention can include monitoring exceptional accesses and incorporating such monitoring data into a review as part of the review analysis.

Further, yet another category includes "uncommon access," which indicates access activity wherein the same entitlement is held by less than a particular percentage of the users in the review. Similar to the "common access" category, the "uncommon access" category can be calculated based at least in part on the entitlements in the review, the total number of users in the review, and the number of those users possessing one or more particular entitlements.

In at least one embodiment of the invention, configuration options for review analysis can be added to a configuration tab of the review definition. Additionally, for example, in connection with the above-noted review analysis categories, check-box options can be implemented in the UI to enable the reviewer to select one or more of the categories for which metrics should be calculated during review generation and review refresh operations. In one or more embodiments of the invention, when a new review definition is created, all of the analysis categories can be checked by default.

Accordingly, one or more embodiments of the invention include implementing a user interface (such as GUI 200 in FIG. 2) that displays the review analysis categories, and the results of the analysis and guidance for the reviewer can also be presented via the user interface. Results can be organized by the categories that the analysis engine generates, and clicking on (or otherwise selecting) a category (such as on the left panel in GUI 200) will obtain the relevant data from the corresponding data structure and display the results for that category. Additionally, in one or more embodiments of the invention, some categories provide a high-level action (such as, for example, maintain access or revoke access) that can be taken automatically on all review items in the category.

Figure 3:
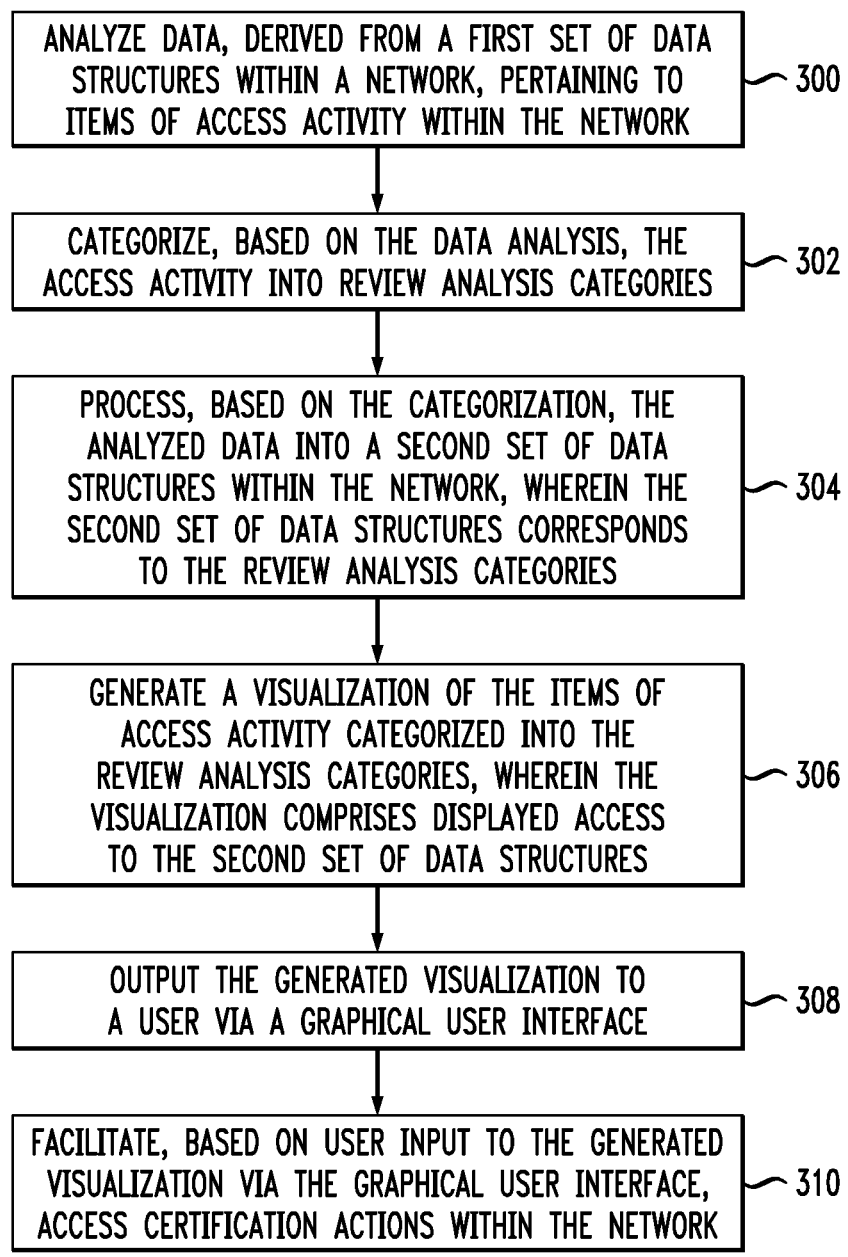
FIG. 3 is a flow diagram of a process for risk analysis and access activity categorization across multiple data structures for use in network security mechanisms in an illustrative embodiment.

FIG. 3 is a flow diagram of a process for risk analysis and access activity categorization across multiple data structures for use in network security mechanisms in an illustrative embodiment. It is to be understood that this particular process is only an example, and additional or alternative processes can be carried out in other embodiments.

In this embodiment, the process includes steps 300 through 310. These steps are assumed to be performed by the processor 120 utilizing its modules 130, 132, and 134.

Step 300 includes analyzing data, derived from a first set of multiple data structures within a network, pertaining to multiple items of access activity within the network. The data pertaining to multiple items of access activity can include identity of one or more users associated with the access activity, one or more destinations associated with the access activity, historical access-related data attributed to one or more users associated with the access activity, and/or one or more items of temporal data associated with the access activity.

Step 302 includes categorizing, based at least in part on the analyzing of the data, the multiple items of access activity into multiple review analysis categories. The review analysis categories can include a category pertaining to infrequently used entitlements, a category pertaining to one or more violations, a category pertaining to instances of previously revoked access, a category pertaining to one or more critical objects, a category pertaining to one or more privileged entitlements, a category pertaining to one or more access determinations approved within a given temporal period, a category pertaining to one or more pending access revocations, a category pertaining to access activity including one or more items unchanged from previous instances of the access activity, and/or a category pertaining to common access activity.

Step 304 includes processing, based at least in part on the categorization, the analyzed data into a second set of multiple data structures within the network, wherein the second set of multiple data structures corresponds to the multiple review analysis categories. For example, in one or more embodiments of the invention, each of the above-noted review analysis categories can linked and/or attributed to a distinct/respective data structure (among the second set of data structures).

Step 306 includes generating a visualization of the multiple items of access activity categorized into the multiple review analysis categories, wherein the visualization comprises displayed access to the second set of multiple data structures. Step 308 includes outputting the generated visualization to at least one user via a graphical user interface. Step 310 includes facilitating, based on one or more user inputs to the generated visualization via the graphical user interface, one or more access certification actions within the network. The one or more access certification actions can include revoking a particular access from one or more users and/or granting a particular access to one or more users.

Accordingly, the particular processing operations and other network functionality described in conjunction with the flow diagram of FIG. 3 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches.

For example, some embodiments are configured to categorize, across distinct data structures, access activity data into pre-determined categories related to different risk attributes based on determinations made via risk analysis algorithms. These and other embodiments can effectively reduce and/or limit challenges associated with missing or overlooking important and/or sensitive data among large sets of data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
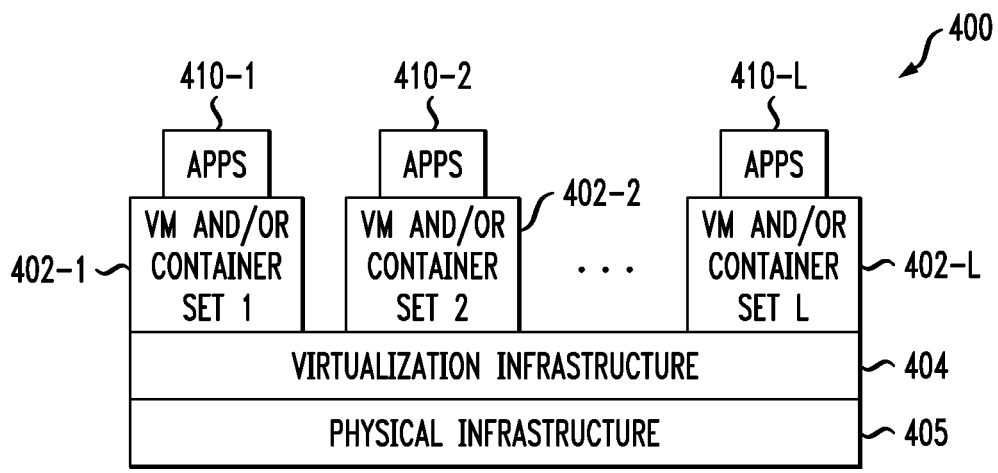
FIGS. 4 and 5 show examples of processing platforms that may be utilized to implement at least a portion of an information processing system in illustrative embodiments.
Figure 5:
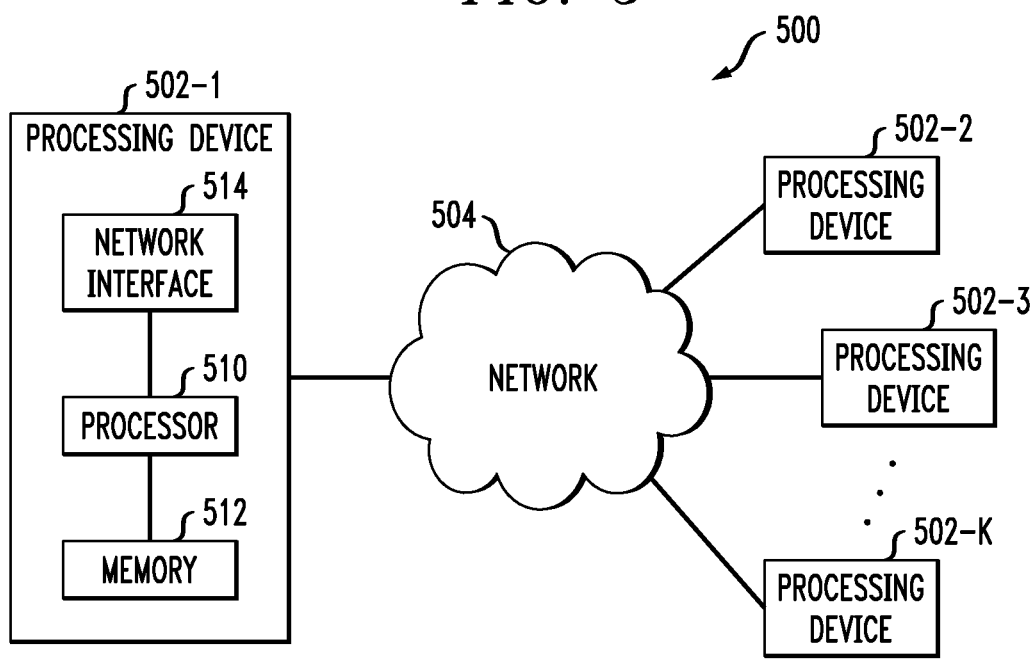

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and efficient access certification decisions. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
analyzing data, derived from a first set of multiple data structures within a network, pertaining to multiple items of access activity within the network;
categorizing, based at least in part on the analyzing of the data, the multiple items of access activity into multiple review analysis categories, wherein the multiple review analysis categories comprise a category pertaining to entitlements held by a percentage of users, (i) associated with the network and (ii) associated with review by a given reviewer, that is below a predetermined percentage threshold;
processing, based at least in part on the categorization, the analyzed data into a second set of multiple data structures within the network, wherein the second set of multiple data structures corresponds to the multiple review analysis categories;

generating a visualization of the multiple items of access activity categorized into the multiple review analysis categories, wherein the visualization comprises displayed access to the second set of multiple data structures;

outputting the generated visualization to at least one reviewer via a graphical user interface; and facilitating, based on one or more reviewer inputs to the generated visualization via the graphical user interface, one or more access certification actions within the network;

wherein the method is performed by at least one processing device comprising a processor coupled to a memory.

2. The computer-implemented method of claim 1, wherein the data pertaining to multiple items of access activity comprise identity of one or more users associated with the access activity and historical access-related data attributed to the one or more users associated with the access activity.

3. The computer-implemented method of claim 1, wherein the data pertaining to multiple items of access activity comprise one or more destinations associated with the access activity.

4. The computer-implemented method of claim 1, wherein the data pertaining to multiple items of access activity comprise one or more items of temporal data associated with the access activity.

5. The computer-implemented method of claim 1, wherein the one or more access certification actions comprise at least one of revoking a particular access from one or more users and granting a particular access to one or more users.

6. The computer-implemented method of claim 1, wherein the review analysis categories comprise a category pertaining to one or more violations.

7. The computer-implemented method of claim 1, wherein the review analysis categories comprise a category pertaining to instances of previously revoked access.

8. The computer-implemented method of claim 1, wherein the review analysis categories comprise a category pertaining to one or more objects associated with a given level of importance.

9. The computer-implemented method of claim 1, wherein the review analysis categories comprise a category pertaining to one or more entitlements associated with a given level of access.

10. The computer-implemented method of claim 1, wherein the review analysis categories comprise a category pertaining to one or more access determinations approved within a given temporal period.

11. The computer-implemented method of claim 1, wherein the review analysis categories comprise a category pertaining to one or more pending access revocations.

12. The computer-implemented method of claim 1, wherein the review analysis categories comprise a category pertaining to access activity including one or more items unchanged from previous instances of the access activity.

13. The computer-implemented method of claim 1, wherein the review analysis categories comprise a category pertaining to access activity associated with a given level of frequency.

14. A non-transitory processor-readable storage medium having stored therein program code of one or more software programs, wherein the program code when executed by at least one processing device causes the at least one processing device:

to analyze data, derived from a first set of multiple data structures within a network, pertaining to multiple items of access activity within the network;

to categorize, based at least in part on the analyzing of the data, the multiple items of access activity into multiple review analysis categories, wherein the multiple review analysis categories comprise a category pertaining to entitlements held by a percentage of users, (i) associated with the network and (ii) associated with review by a given reviewer, that is below a predetermined percentage threshold;

to process, based at least in part on the categorization, the analyzed data into a second set of multiple data structures within the network, wherein the second set of multiple data structures corresponds to the multiple review analysis categories;

to generate a visualization of the multiple items of access activity categorized into the multiple review analysis categories, wherein the visualization comprises displayed access to the second set of multiple data structures;

to output the generated visualization to at least one reviewer via a graphical user interface; and to facilitate, based on one or more reviewer inputs to the generated visualization via the graphical user interface, one or more access certification actions within the network.

15. The non-transitory processor-readable storage medium of claim 14, wherein the data pertaining to multiple items of access activity comprise at least one of identity of one or more users associated with the access activity, one or more destinations associated with the access activity, historical access-related data attributed to one or more users associated with the access activity, and one or more items of temporal data associated with the access activity.

16. The non-transitory processor-readable storage medium of claim 14, wherein the review analysis categories comprise at least one of a category pertaining to one or more violations, a category pertaining to instances of previously revoked access, a category pertaining to one or more objects associated with a given level of importance, a category pertaining to one or more entitlements associated with a given level of access, a category pertaining to one or more access determinations approved within a given temporal period, a category pertaining to one or more pending access revocations, a category pertaining to access activity including one or more items unchanged from previous instances of the access activity, and a category pertaining to common access activity.

17. An apparatus comprising:

at least one processing device comprising a processor coupled to a memory;

the at least one processing device being configured:

to analyze data, derived from a first set of multiple data structures within a network, pertaining to multiple items of access activity within the network;

to categorize, based at least in part on the analyzing of the data, the multiple items of access activity into multiple review analysis categories, wherein the multiple review analysis categories comprise a category pertaining to entitlements held by a percentage of users, (i) associated with the network and (ii) associated with review by a given reviewer, that is below a predetermined percentage threshold;

to process, based at least in part on the categorization, the analyzed data into a second set of multiple data structures within the network, wherein the second set of multiple data structures corresponds to the multiple review analysis categories;

to generate a visualization of the multiple items of access activity categorized into the multiple review analysis categories, wherein the visualization comprises displayed access to the second set of multiple data structures;

to output the generated visualization to at least one reviewer via a graphical user interface; and to facilitate, based on one or more reviewer inputs to the generated visualization via the graphical user interface, one or more access certification actions within the network.

18. The apparatus of claim 17, wherein the data pertaining to multiple items of access activity comprise at least one of identity of one or more users associated with the access activity, one or more destinations associated with the access activity, historical access-related data attributed to one or more users associated with the access activity, and one or more items of temporal data associated with the access activity.

19. The apparatus of claim 17, wherein the review analysis categories comprise at least one of a category pertaining to one or more violations, a category pertaining to instances of previously revoked access, a category pertaining to one or more objects associated with a given level of importance, a category pertaining to one or more entitlements associated with a given level of access, a category pertaining to one or more access determinations approved within a given temporal period, a category pertaining to one or more pending access revocations, a category pertaining to access activity including one or more items unchanged from previous instances of the access activity, and a category pertaining to common access activity.

20. The apparatus of claim 17, wherein the one or more access certification actions comprise at least one of revoking a particular access from one or more users and granting a particular access to one or more users.

* * * * *